United States Patent [19]

Engelhardt et al.

[11] Patent Number: 4,521,579
[45] Date of Patent: Jun. 4, 1985

[54] HIGH MOLECULAR WEIGHT WATER-SOLUBLE POLYMERS USEFUL IN DEOILING SAND AND ROCK MASSES

[75] Inventors: Friedrich Engelhardt; Hermann Schmitz, both of Frankfurt am Main; Walter Gulden, Hofheim; Jörg Hax, Wiesbaden, all of Fed. Rep. of Germany

[73] Assignee: Cassella Aktiengesellschaft, Frankfurt am Main, Fed. Rep. of Germany

[21] Appl. No.: 480,010

[22] Filed: Mar. 29, 1983

Related U.S. Application Data

[63] Continuation of Ser. No. 283,497, Jul. 15, 1981, abandoned.

[30] Foreign Application Priority Data

Jul. 19, 1980 [DE] Fed. Rep. of Germany ....... 3027422

[51] Int. Cl.³ ............................................. C08F 228/02
[52] U.S. Cl. ..................................... 526/287; 524/405
[58] Field of Search ......................... 524/405; 526/287

[56] References Cited

U.S. PATENT DOCUMENTS 4,048,077 9/1977 Engelhardt ......................... 526/287
4,309,523 1/1982 Engelhardt ......................... 526/240

*Primary Examiner*—Christopher A. Henderson
*Attorney, Agent, or Firm*—Connolly and Hutz

[57] ABSTRACT

Sand or rock masses containing mineral oil are deoiled with a deoiling agent containing an aqueous solution of a water-soluble copolymer which is a random distribution of 5 to 60% of weight of units of the formula

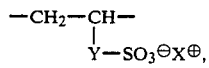

2 to 40% by weight of units of the formula

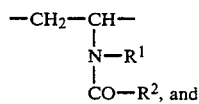

38 to 93% by weight of units of the formula

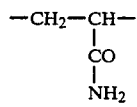

and partial hydrolysates thereof, wherein when $R^1$ is hydrogen, $R^2$ is hydrogen, methyl or ethyl, Y is $-CO-NH-C(CH_3)_2-CH_2-$ or a direct bond, and $X^\oplus$ is a cation; when $R^1$ and $R^2$ are identical or different, each is hydrogen, methyl, ethyl or, together are trimethylene, Y is $-CO-NH-C(CH_3)_2-CH_2-$ and $X^\oplus$ is a cation.

5 Claims, No Drawings

HIGH MOLECULAR WEIGHT WATER-SOLUBLE POLYMERS USEFUL IN DEOILING SAND AND ROCK MASSES

This application is a continuation of application Ser. No. 283,497 filed July 15, 1981, now abandoned.

FIELD OF THE INVENTION

The present invention relates to water-soluble copolymers which consist, in random distribution, of radicals of the formula I

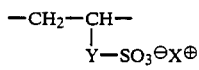 (I)

to the extent of 5 to 60% by weight, of radicals of the formula II

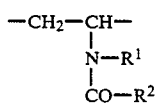 (II)

to the extent of 2 to 40% by weight, and of radicals of the formula III

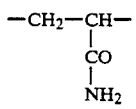 (III)

to the extent of 38 to 95% by weight, and derivatives thereof which are obtainable by partial hydrolysis, in which $R^1$ and $R^2$ are identical or different and denote hydrogen, methyl or ethyl or, where appropriate, together denote trimethylene, Y denotes the radical $-CO-NH-C(CH_3)_2-CH_2-$ or a direct bond and $X^\oplus$ denotes a cation, and to their preparation and their use as auxiliaries in the deoiling of sand and rock masses containing mineral oil.

BACKGROUND

An industrial problem which has not yet been solved satisfactorily is the deoiling of sand and rock masses containing mineral oil.

Sand and rock masses containing mineral oil are present in petroleum deposits and usually tenaciously retain the mineral oil contained therein.

Extraction of oil-containing sand or rock masses with low-viscosity organic solvents, such as, for example, benzine, petroleum ether or halogenoalkanes, can be carried out on a small scale without problems, and also has the desired effect.

However, in the case of most inorganic masses which contain mineral oil and which are present, extraction with organic solvents is absolutely impossible to carry out because of the very large amounts of solvents required, the large amounts of energy associated with recovery of the solvents and the unavoidable losses in solvent, which lead to additional pollution of the environment or to separate expenditure on the purification of waste air.

A process has thus been described, at various times, in which sand and rock masses containing mineral oil are washed thoroughly with water in order to expel the mineral oil mechanically.

However, this process does not enable all the mineral oil contained in the masses to be expelled. Rather, by far the major proportion remains, because the water cannot overcome the forces of adhesion between the oil and rock and the capillary forces, generally the so-called retention forces, and makes channels for itself, through which it flows without effect. The main reasons for this are the different surface tensions between the sand or rock and oil on the one hand and water on the other hand, and the differences in the viscosities of oil and water, which are frequently very high. Attempts have therefore already been made to employ surface-active agents, such as, for example, alkanesulphonates and/or thickeners based on water-soluble polymers or on polysaccharide derivatives, as auxiliaries in the water flooding of petroleum deposits (so-called chemical flooding, tertiary extraction).

However, it has been found that such diverse, high requirements have been placed beyond the surface-active effect and thickener effect of chemical agents of this type that the products used hitherto still leave much to be desired.

A particular disadvantage of the auxiliaries known hitherto resides in the fact that they largely lose their effectiveness in the presence of electrolytes. The use of the unlimited supply of seawater for flooding formations containing mineral oil is thus excluded. A deoiling auxiliary is thus required also to be effective in the presence of electrolytes, this requirement being of particularly great importance for the deoiling of offshore oilfields.

As model experiments in which sand or rock packings containing mineral oil are deoiled and which are confirmed in practice show, it is still essential that the washing liquid can readily be injected, that is to say that it changes as little as possible with time as it flows through porous materials and that it also has optimum rheological properties at different shear rates.

If the deoiling auxiliary is used in the oil extraction sector it is necessary that the products are stable and effective for a long period, even at the high deposit temperatures, and do not damage the deposits and are also effective in the presence of a high electrolyte concentration. Precisely in respect of their compatibility with electrolytes and their stability to heat, the polymers which are thus far known, for example from U.S. Pat. No. 2,775,557 and German Patent Specifications 1,300,481 and 2,444,108, and act as thickeners do not yet fulfil the requirements in practice.

SUMMARY OF THE INVENTION

It has now been found that the previous disadvantages encountered in deoiling sand and rock masses containing mineral oil can be eliminated or considerably reduced by adding to the washing water 20 to 5,000 ppm of a water-soluble copolymer which consists, in random distribution, of radicals of the formula I

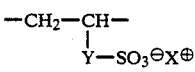 (I)

to the extent of 5 to 60% by weight, of radicals of the formula II

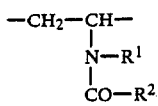 (II)

to the extent of 2 to 40% by weight, and of radicals of the formula III

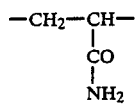 (III)

to the extent of 38 to 93% by weight, or a derivative which can be obtained by partial hydrolysis of this copolymer, wherein $R^1$ and $R^2$ are identical or different and denote hydrogen, methyl or ethyl or, where appropriate, together denote trimethylene, Y denotes the radical $-CO-NH-C(CH_3)_2-CH_2-$ or a direct bond and $X^\oplus$ denotes a cation, which copolymer, surprisingly, compared with the most comparable products known from U.S. Pat. No. 2,775,557 and German Patent Specifications 1,300,481 and 2,444,108, is particularly distinguished by a considerably higher stability to electrolytes and heat and hence an increased viscosity stability in seawater and highly saline formation waters (a salt concentration of up to 25% by weight of NaCl), even in the presence of polyvalent ions, in particular alkaline earth metal ions, and by an excellent stability to temperatures of up to about 150° C. for long periods, and is therefore considerably superior to the known products as an agent for increasing the viscosity for deoiling sand and rock masses in the chemical flooding of petroleum deposits.

DETAILED DESCRIPTION

The cation $X^\oplus$ can in principle be derived from any water-soluble known base which has a sufficient strength to neutralise the sulpho groups of the copolymers to be employed according to the invention and which does not impair the water-solubility of the copolymers. The cation can thus be selected in a simple known manner.

However, $X^\oplus$ is advantageously an alkali metal cation, in particular a sodium or potassium cation, or a cation of the formula $N\overset{\#}{H}R_3^3$, in which the three radicals $R^3$ are identical or different and represent hydrogen, alkyl with 1 to 4 C atoms or hydroxyethyl.

Preferred copolymers which can be employed according to the invention consist, in random distribution, of radicals of the formula I to the extent of 5 to 50% by weight, of radicals of the formula II to the extent of 2 to 20% by weight and of radicals of the formula III to the extent of 45 to 90% by weight, or of hydrolysis products thereof.

Particularly preferred copolymers which are to be employed according to the invention contain radicals of the formula I in which Y denotes the radical $-CO-NH-C(CH_3)_2-CH_2-$, and radicals of the formula II in which $R^1=R^2=CH_3$. In the derivatives which can be obtained by partial hydrolysis of the copolymers to be employed according to the invention, a proportion of up to 60%, preferably 10–30%, of the radicals of the formula III originally present are replaced by radicals of the formula IV

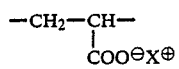 (IV)

in which $X^\oplus$ has the abovementioned meanings. The degree of hydrolysis is advantageously chosen higher, within this range, the lower the sulphonic acid content in the copolymer, and vice versa.

Preferred partial hydrolysis products according to the invention contain a total of 20 to 60% by weight of groups of the formulae I and IV.

Those copolymers of the given chemical composition which have a high degree of polymerisation and therefore exhibit particularly high viscosities in aqueous solution are also preferred.

The very good viscosity-increasing effect of the copolymers to be employed according to the invention and of their partial hydrolysis products in concentrated salt solutions and their stability to heat is in many cases increased still further by the presence of borate anions. These advantageous copolymers containing borate anions, and partial hydrolysis products thereof, contain 2.5 to 35% by weight, preferably 5 to 25% by weight, of borate anions, calculated as $H_3BO_3$, relative to the weight of the non-saponified polymers.

As well as being based on the advantageous properties of the functional groups contained in the copolymer and on the effect of a high degree of polymerisation, which results, in particular, when the copolymers are prepared by gel polymerisation, the viscosities in concentrated salt solutions, which are considerably higher than those of the copolymers known hitherto, and the temperature stability are probably based on an additional interaction of the borate anions with the chains of the copolymers.

Those copolymers according to the invention and copolymers to be employed according to the invention which contain several preferred characteristics are particularly preferred.

Water-soluble copolymers which are to be employed according to the invention and which consist, in random distribution, of radicals of the formula I

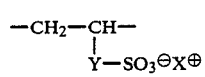 (I)

to the extent of 5 to 60% by weight, of radicals of the formula II

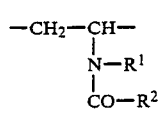 (II)

to the extent of 2 to 40% by weight, and of radicals of the formula III

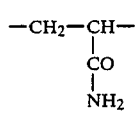 (III)

to the extent of 38 to 93% by weight, and derivatives thereof which can be obtained by partial hydrolysis, wherein either $R^1$ denotes hydrogen, $R^2$ denotes hydrogen, methyl or ethyl, Y denotes the radical —CO—NH—C(CH$_3$)$_2$—CH$_2$— or a direct bond and X$^\oplus$ denotes a cation, or R$^1$ and R$^2$ are identical or different and denote hydrogen, methyl or ethyl or, where appropriate, together denote trimethylene, Y denotes the radical —CO—NH—C(CH$_3$)$_2$—CH$_2$— and X$^\oplus$ denotes a cation, have not yet been disclosed.

With the exception of the water-soluble copolymers which consist, in random distribution, of radicals of the formula Ia

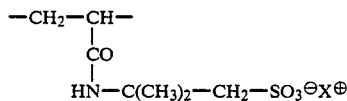  (Ia)

to the extent of 5 to 60% by weight, of radicals of the formula IIa

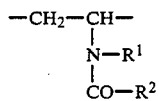  (IIa)

to the extent of 5 to 40% by weight, and of radicals of the formula IIIa

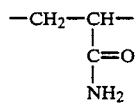  (IIIa)

to the extent of 38 to 80% by weight, wherein R$^1$ and R$^2$ are identical or different and denote hydrogen, methyl or ethyl and X$^\oplus$ is a cation, which copolymers are already the subject of the earlier patent application Ser. No. 174,731, filed Aug. 1, 1980, now U.S. Pat. No. 4,309,523, issued Jan. 5, 1982, the water-soluble copolymers which are not yet known and are to be employed according to the invention are new and are likewise the subject of this invention.

In other words, the subject matter of this invention comprises the following water-soluble copolymers:

Water-soluble copolymers which consist esssentially of a random distribution of 5 to 60% by weight of units of the formula

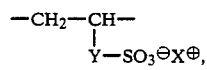

2 to 40% by weight of units of the formula

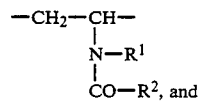

38 to 93% by weight of units of the formula

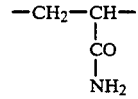

wherein R$^1$ and R$^2$ together are trimethylene, Y is —CO—NH—C(CH$_3$)$_2$—CH$_2$— and X$^\oplus$ is a cation; further water-soluble copolymers which consist essentially of a random distribution of 5 to 60% by weight of units of the formula

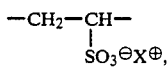

2 to 40% by weight of units of the formula

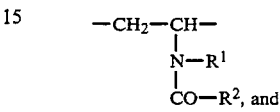

38 to 93% by weight of units of the formula

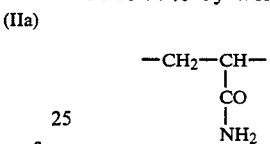

wherein R$^1$ is hydrogen, R$^2$ is hydrogen, methyl or ethyl and X$^\oplus$ is a cation; further water-soluble copolymers which consist essentially of a random distribution of 5 to 60% by weight of units of the formula

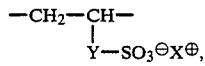

2 to 40% by weight of units of the formula

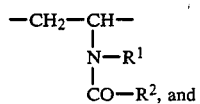

80 to 93% by weight of units of the formula

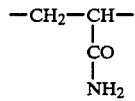

wherein when R$^1$ is hydrogen, R$^2$ is hydrogen, methyl or ethyl, Y is —CO—NH—C(CH$_3$)$_2$—CH$_2$— or a direct bond, and X$^\oplus$ is a cation; when R$^1$ and R$^2$ are identical or different, each is hydrogen, methyl, ethyl or, together are trimethylene, Y is —CO—NH—C(CH$_3$)$_2$—CH$_2$— and X$^\oplus$ is a cation; and further water-soluble copolymers which consist essentially of a random distribution of 5 to 60% by weight of units of the formula

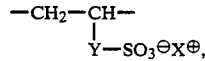

2 to 5% by weight of units of the formula

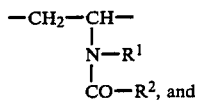

38 to 93% by weight of units of the formula

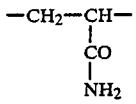

wherein when $R^1$ is hydrogen, $R^2$ is hydrogen, methyl or ethyl, Y is $-CO-NH-C(CH_3)_2-CH_2-$ or a direct bond, and $X^\oplus$ is a cation; when $R^1$ and $R^2$ are identical or different, each is hydrogen, methyl, ethyl or, together are trimethylene, Y is $-CO-NH-C(CH_3)_2-CH_2-$ and $X^\oplus$ is a cation; and further the partial hydrolysates of water-soluble copolymers which consist essentially of random distribution of 5 to 60% by weight of units of the formula

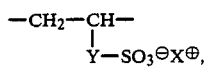

2 to 40% by weight of units of the formula

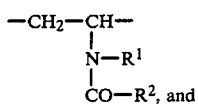

38 to 93% by weight of units of the formula

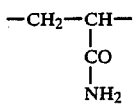

wherein when $R^1$ is hydrogen, $R^2$ is hydrogen, methyl or ethyl, Y is $-CO-NH-C(CH_3)_2-CH_2-$ or a direct bond, and $X^\oplus$ is a cation; when $R^1$ and $R^2$ are identical or different, each is hydrogen, methyl, ethyl or, together are trimethylene, Y is $-CO-NH-C(CH_3)_2-CH_2-$ and $X^\oplus$ is a cation.

The preparation of water-soluble polymers which contain sulphonic acid groups incorporated in the macromolecule has already been described in detail in numerous patents and in the technical literature. Thus, for example, the synthesis of copolymers of vinylsulphonic acid with acrylamide and vinylpyrrolidone has been published in J. Polymer Sci., 38 147 (1959). A process for the preparation of water-soluble copolymers of vinylsulphonic acid and acrylonitrile or methacrylonitrile, optionally as a mixture with further ethylenically unsaturated compounds, has been described in German Pat. No. 1,101,760. Copolymers of vinyl sulphonates or alkenyl sulphonates with acrylamide and vinylamides have been described, for example, in German Auslegeschrift No. 2,444,108.

Water-soluble copolymers which contain 2-acrylamido-2-methylpropanesulphonic acid, abbreviated to AMPS in the following text, as the comonomer are described in U.S. Pat. Nos. 3,953,342 and 3,768,565, German Offenlegungsschriften Nos. 2,502,012 and 2,547,773 and U.S. Pat. Nos. 3,907,927, 3,926,718 and 3,948,783. Thus, for example, copolymers of vinylpyrrolidone and AMPS can be prepared in accordance with the statements of U.S. Pat. No. 3,929,741, Example 10.

If the copolymerisation of AMPS with non-cyclic N-vinylamides of the general formula

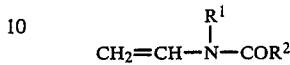

is carried out under analogous conditions, however, no polymerisation to give water-soluble products takes place. It was thus not possible for the water-soluble copolymers which are to be employed according to the invention and which contain both copolymerised AMPS or vinyl sulphonic acid and copolymerised non-cyclic N-vinyl-acylamides to be prepared by the known methods.

The water-soluble copolymers which are to be employed according to the invention and are not yet known are prepared, however, if, for the preparation of each 100 parts by weight of the copolymer, either 5 to 60 parts by weight of 2-acrylamido-2-methyl-propanesulphonic acid of the formula Ib $$CH_2=CH-CO-NH-C(CH_3)_2-CH_2-SO_3H \qquad (Ib)$$

of vinylsulphonic acid of the formula Ic $$CH_2=CH-SO_3H \qquad (Ic)$$

are dissolved in water, the sulphonic acid is neutralised by adding a base and 2 to 40 parts by weight of a vinylacylamide of the formula IIb

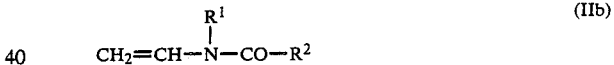

in which $R^1$ denotes hydrogen and $R^2$ denotes hydrogen, methyl or ethyl, and 38 to 93 parts by weight of acrylamide are then added, or if, for the preparation of each 100 parts by weight of the copolymer, 5 to 60 parts by weight of 2-acrylamido-2-methyl-propanesulphonic acid of the formula Ib $$CH_2=CH-CO-NH-C(CH_3)_2-CH_2-SO_3H \qquad (Ib)$$

are dissolved in water, the sulphonic acid is neutralised by adding a base, 2 to 40 parts by weight of a vinylacylamide of the formula IIb

wherein $R^1$ and $R^2$ are identical or different and denote hydrogen, methyl or ethyl or, where appropriate, together denote trimethylene, and 38 to 93 parts by weight of acrylamide are then added, the copolymerisation is initiated in a manner which is in itself known and is carried out at 0° to 130° C. and, if appropriate, the copolymers are also partially hydrolysed during or after the polymerisation reaction. Polymers which are not yet the subject of the earlier patent application Ser. No. 174,731, filed Aug. 1, 1980 (now U.S. Pat. No. 4,309,523 issued Jan. 5, 1982) are always obtained if partial hydrolysis is carried out or if at least one of the following conditions is fulfilled: (1) vinylsulphonic acid is employed in the polymerisation, that is to say Y is a direct bond, or (2) the vinylacylamide of the formula IIb is employed in an amount of 2 to 5 parts by weight, or (3) the acrylamide is employed in an amount of 80–93 parts by weight, or (4) $R^1$ and $R^2$ in the vinylacylamide of the formula IIb together denote trimethylene.

Preferred copolymers according to the invention are obtained if, for the preparation of each 100 parts by weight of the copolymer, 5–50 parts by weight of 2-acrylamido-2-methylpropanesulphonic acid of the formula Ib or vinylsulphonic acid of the formula Ic, 2–20 parts by weight of the vinylacylamide of the formula IIb and 45–90 parts by weight of acrylamide are employed.

It is particularly preferable to use compounds of the formulae Ib and IIb in which $R^1=R^2=CH_3$, together with acrylamide.

If desired, the copolymers according to the invention are also partially hydrolysed. In principle, any water-soluble base of sufficient strength for reaction with the hydrolysable groups can be employed as the hydrolysing agent. However, NaOH, KOH, $NH_3$ or neutral or acid alkali metal salts (in particular sodium and potassium salts) or ammonium salts of carbonic acid, boric acid or phosphoric acid are preferred. The hydrolysing agent is either already added to the monomer solution or mixed with the polymer. Depending on the procedure, the hydrolysis thus takes place already during the polymerisation, which usually proceeds as an exothermic reaction, or by heating the mixture further after the polymerisation. A combination of the two procedures is also possible.

The products containing borate anions, which are in many cases advantageous, can be obtained in a simple manner by employing the sodium or potassium salts of boric acid (ortho-, meta- or poly-borates or boric acid together with NaOH, or KOH) as the hydrolysing agent.

From Makromol. Chem. 1, 169 (1947) Bios Final Rep.. 363, 22 and e.g. K. E. J. Barrett, "Dispersion Polymerisation in Organic Media", John Wiley+Sons, (1975) it is known that the rate of polymerisation significantly rises as the mobility of the polymer chains formed in the first phase of the polymerisation deminishes. This effect, the Trommsdorff-Norrish effect, sometimes also called gel effect, is promoted if the reaction batch is allowed to react without any motion, i.e. without stirring.

The auto acceleration of the rate is associated with a corresponding increase in chain length, and, consequently, in overall molecular weight.

Hence, preferred copolymers according to the invention and to be employed according to the invention which have a particularly high degree of polymerisation are obtained if the polymerisation is carried out in aqueous solution by the so-called gel polymerisation process. In this procedure, 15–50% strength aqueous solutions of the comonomers are polymerised with known suitable catalyst systems and, if appropriate, with one of the hydrolysing agents mentioned, without mechanical mixing and by utilising the Trommsdorff-Norrish effect. On the basis the customary model conceptions of the correlation between the viscosities and the mean molecular weights of polymer substances, as well as when considering comparative values of similarly structured polymers for the products of the invention mean molecular weights of $2.10^6$ to $10.10^6$ can be estimated from the high viscosities of aqueous, in particular of electrolyte-containing aqueous, solutions of the water-soluble copolymers of and to be used according to the invention which are prepared in this manner. The polymerisation reaction can be carried out in the temperature range between 0° C. and 130° C., preferably between 10° C. and 100° C., either under normal pressure or under increased pressure. As is customary, the polymerisation can also be carried out in an inert gas atmosphere, preferably under nitrogen.

High-energy electromagnetic radiation or the customary chemical polymerisation initiators can be used to trigger off the polymerisation, for example organic peroxides, such as benzoyl peroxide, tert.-butyl hydroperoxide, methyl ethyl ketone-peroxide and cumene hydroperoxide, azo compounds, such as azodiisobutyronitrile, and inorganic peroxy compounds, such as $(NH_4)_2S_2O_8$ or $K_2S_2O_8$ or $H_2O_2$, if appropriate in combination with reducing agents, such as sodium bisulphite, and iron-II sulphate, or redox systems which contain, as the reducing component, an aliphatic or aromatic sulphinic acid, such as benzenesulphinic acid or toluenesulphinic acid, or derivatives of these acids, such as, for example, Mannich adducts of sulphinic acid, aldehydes and amino compounds, such as are described in German Patent Specification No. 1,301,566. As a rule, 0.03 to 2 g of the polymerisation initiator are employed per 100 g of total monomer.

The quality characteristics of the polymers can be improved further by subsequently heating the polymer gels in the temperature range from 50° to 130° C., preferably at 70°–100° C., for several hours.

The copolymers according to the invention which have been prepared by this route and are in the form of aqueous gels can, after mechanical comminution with suitable equipment, be directly dissolved in water and used. However, they can also be obtained in solid form after removal of the water by known drying processes, and only be dissolved again in water when they are used.

The following abbreviations are used in the following embodiment examples, which illustrate the preparation of the water-soluble copolymers to be employed according to the invention and, in particular, of new copolymers according to the invention, and in the subsequent table:

| | |
|---|---|
| AM | acrylamide |
| VIMA | N—vinyl-N—methyl-acetamide |
| VIPY | N—vinylpyrrolidone |
| AMPS | 2-acrylamido-2-methyl-propanesulphonic acid |
| VA | vinylacetamide |
| VF | vinylformamide |
| VSS—Na | sodium vinyl-sulphonate |

The following bases were used to neutralize the mixtures

| | |
|---|---|
| A | NaOH |
| B | KOH |
| C | $NH_3$ |
| D | dimethyl-$\beta$-hydroxyethylamine |

In the column "Catalysts", the symbols have the following meanings:

| | |
|---|---|
| APS | ammonium peroxydisulphate |
| DBA | dibutylammonium chloride |

EXAMPLE 1

30 g of AMPS are dissolved in 560 ml of deionised water and the solution is neutralised with KOH in a polymerisation flask which has a capacity of 1 l and is provided with a ground-glass lid, stirrer, thermometer and gas inlet tube. 160 g of AM, 42.8 g of $K_2CO_3$ and 10 g of N-vinyl-N-methyl-acetamide are then added, and are dissolved at 20°–21° C. in the course of 15 minutes, whilst stirring and passing in nitrogen. 4 g of 10% strength dibutylammonium chloride solution are now added, nitrogen is passed in for a further 15 minutes, whilst stirring, 120 mg of APS, dissolved in 8 g of water, are added and the mixture is stirred at an increased speed for a further 3 minutes, whilst passing in nitrogen. The introduction of $N_2$ is ended and the inlet tube and stirrer are raised. After an induction time of about 45 minutes, polymerisation starts, whereupon the internal temperature rises to 67° C. and the solution is converted into a dimensionally stable gel. The polymer is then heated to 80° C. for a further 12 hours. The viscosities at 20° C. measured in a Brookfield viscosimeter at a shear rate of $D=7.3\ s^{-1}$ are:

$\eta_A$ 42.5 mPa.s in 0.05% strength aqueous solution of 3.5° German degree of hardness $\eta_B = 18.7$ mPa.s in 0.2% strength aqueous solution with a salt content of 130 g of NaCl and 10 g of $CaCl_2$ per liter.

The homopolymers and copolymers, known from the literature or commercially available, have viscosities $\eta_A$ that are 30 to 80% and viscosities $\eta_B$ that are about 60% below these values when measured under the same conditions.

EXAMPLE 2

120 g of AMPS and then 76 g of AM and 4 g of VIMA are added in portions, whilst cooling and stirring and whilst passing in nitrogen, to a solution of 23 g of NaOH in 560 g of deionised water in a polymerisation flask which has a capacity of 2 l and is provided with a ground-glass lid, stirrer, thermometer and gas inlet tube. The mixture is stirred for about 15 minutes, 4 g of 10% strength DBA solution are then added, nitrogen is passed in for a further 15 minutes, whilst stirring, 120 mg of APS, dissolved in 8 g of water, are then added and the mixture is subsequently stirred at an increased speed for a further 3 minutes, whilst passing in nitrogen. The introduction of $N_2$ is ended and the inlet tube and stirrer are raised. After an induction time of about 30 minutes, polymerisation starts, whereupon the internal temperature rises to 58° C. and the solution is converted into a dimensionally stable gel. The following viscosities are measured at 20° C.:

$\eta_A = 38.2$ mPa.s $\eta_B = 17.2$ mPa.s

The copolymers in the table can also be prepared by these preparation examples.

| No. | AM | VIMA | AMPS | VSS-Na | VIPY | Further additives (relative to the total monomer content) | Base | Catalysts | $\eta A$ [mPas] | $\eta B$ [mPas] |
|---|---|---|---|---|---|---|---|---|---|---|
| 3  | 70 | 10  | 20 |    |   | 6.1% $H_3BO_3$      | A | APS/DBA | 13.9 | 5.8  |
| 4  | 93 |     | 5  |    | 2 | 24.8% $K_2CO_3$     | B | APS/DBA | 56.4 | 16.1 |
| 5  | 85 | 5   | 10 |    |   | 22.7% $K_2CO_3$     | B | APS/DBA | 55,6 | 15.2 |
| 6  | 90 | 5   | 5  |    |   | 18.0% $Na_2CO_3$    | A | APS/DBA | 45,5 | 14.4 |
| 7  | 83 | 7   | 10 |    |   | 16.6% $Na_2CO_3$    | A | APS/DBA | 38.5 | 14.9 |
| 8  | 83 | 7   | 10 |    |   | 19.8% $H_3BO_3$     | A | APS     | 50.7 | 12.7 |
| 9  | 85 |     | 10 |    | 5 | 22.7% $K_2CO_3$     | B | APS/DBA | 34.4 | 13.0 |
| 10 | 80 | 5   | 15 |    |   | 19% $H_3BO_3$       | A | APS     | 51.5 | 11,9 |
| 11 | 65 | 5¹  | 30 |    |   | 2.8% $H_3BO_3$      | B | APS     | 25,7 | 9,2  |
| 12 | 60 | 5   | 35 |    |   | 5.2% $H_3BO_3$      | A | APS     | 28.8 | 8.0  |
| 13 | 80 | 5²  | 15 |    |   | 19.1% $Na_2CO_3$    | A | APS/DBA | 45.0 | 12.6 |
| 14 | 85 | 5²  | 10 |    |   | 20.3% $H_3BO_3$     | A | APS     | 31.5 | 10.0 |
| 15 | 85 |     |    | 10 | 5 | 20.4% $H_3BO_3$     | A | APS/DBA | 51.0 | 13.2 |
| 16 | 38 | 2   | 60 |    |   |                     | A | APS     | 20.0 | 7,7  |
| 17 | 78 | 7   | 15 |    |   | 20.8% $Na_2CO_3$    | A | APS     | 33.9 | 11.1 |
| 18 | 83 | 2   | 15 |    |   | 22.2% $Na_2CO_3$    | A | APS     | 31.0 | 9.9  |
| 19 | 65 |     | 30 |    | 5 | 8.5% $H_3BO_3$      | A | APS     | 40.5 | 11.6 |
| 20 | 90 | 5¹  | 5  |    |   | 27.5% $H_3BO_3$     | A | APS/DBA | 51.9 | 13.4 |
| 21 | 72 | 8   | 20 |    |   | 12.6% $H_3BO_3$     | A | APS     | 37.8 | 10.2 |
| 22 | 40 | 10  | 50 |    |   |                     | A | APS/DBA | 14.8 | 3.3  |
| 23 | 60 | 5   | 35 |    |   | 2.6% $H_3BO_3$      | A | APS     | 16.4 | 6.4  |
| 24 | 55 | 5   | 40 |    |   |                     | A | APS/DBA | 17.8 | 5,0  |
| 25 | 50 | 10  | 40 |    |   |                     | A | APS/DBA | 18.3 | 6.9  |
| 26 | 45 | 15  | 40 |    |   |                     | A | APS/DBA | 18,8 | 2,4  |
| 27 | 60 | 10  | 30 |    |   | 5.2% $H_3BO_3$      | A | APS     | 13,4 | 4,6  |
| 28 | 75 |     | 20 |    | 5 | 3.3% $H_3BO_3$      | A | APS     | 25.0 | 10.0 |
| 29 | 65 | 5   | 30 |    |   |                     |   | APS/DBA | 18.3 | 9.3  |
| 30 | 75 |     | 18 |    | 7 | 6.5% $H_3BO_3$      | A | APS     | 31.2 | 11.1 |
| 31 | 75 | 7²  | 18 |    |   | 9.8% $H_3BO_3$      | A | APS     | 22.2 | 11.0 |
| 32 | 70 | 10  | 20 |    |   | 6.1% $H_3BO_3$      | B | APS     | 13.6 | 7.3  |
| 33 | 83 | 7   |    | 10 |   | 21.8% $H_3BO_3$     | B | APS     | 29.3 | 9.8  |
| 34 | 80 | 10  | 10 |    |   | 14% $H_3BO_3$       | A | APS     | 20.2 | 7.4  |
| 35 | 68 | 2   | 30 |    |   | 5.9% $H_3BO_3$      | A | APS     | 26.0 | 10.9 |
| 36 | 70 | 10  | 20 |    |   | 16.3% $H_3BO_3$     | A | APS     | 15.1 | 5.2  |
| 37 | 70 | 5   | 25 |    |   | 15.3% $H_3BO_3$     | B | APS     | 20,2 | 12.2 |
| 38 | 83 | 2   | 15 |    |   | 19.9% $H_3BO_3$     | A | APS     | 37,6 | 11.9 |
| 39 | 78 | 2   | 20 |    |   | 18.6% $H_3BO_3$     | A | APS     | 29.5 | 11.0 |
| 40 | 73 | 2   | 25 |    |   | 6.4% $H_3BO_3$      | A | APS     | 31.3 | 12.0 |
| 41 | 70 |     | 25 |    | 5 | 12.2% $H_3BO_3$     | B | APS     | 44,8 | 15.0 |
| 42 | 40 | 5   | 55 |    |   |                     | A | APS/DBA | 20.5 | 6.0  |
| 43 | 50 | 5   | 45 |    |   |                     | B | APS/DBA | 20,6 | 11,2 |
| 44 | 68 | 2   | 30 |    |   |                     | C | APS/DBA | 13,4 | 8,9  |

-continued

| No. | AM | VIMA | AMPS | VSS-Na | VIPY | Further additives (relative to the total monomer content) | Base | Catalysts | ηA [mPas] | ηB [mPas] |
|---|---|---|---|---|---|---|---|---|---|---|
| 45 | 73 | 2 | 25 | | | | D | APS/DBA | 10,7 | 7.6 |
| 46 | 70 | 10 | 20 | | | 22.2% NaHCO$_3$ | A | APS | 10,2 | 4.8 |
| 47 | 80 | 5 | | 15 | | 19.3% H$_3$BO$_3$ | B | APS | 16,2 | 7.5 |
| 48 | 93 | 2 | 5 | | | 22.4% H$_3$BO$_3$ | A | APS | 81,0 | 11.5 |
| 49 | 85 | 5 | 10 | | | 17% Na$_2$CO$_3$ | A | APS | 46.2 | 10.3 |
| 50 | 88 | 2 | 10 | | | 21.1% H$_3$BO$_3$ | A | APS | 52.5 | 11.0 |
| 51 | 85 | 5[1] | 10 | | | 11.1% H$_3$BO$_3$ | B | APS | 50.4 | 9.8 |
| 52 | 80 | 3 | 17 | | | 3.5% H$_3$BO$_3$ | A | APS | 36.3 | 12,0 |
| 53 | 70 | 5[2] | 25 | | | | A | APS/DBA | 71,0 | 25,0 |
| 54 | 57 | 3 | 40 | | | | B | APS/DBA | 22.3 | 10.0 |
| 55 | 75 | 5 | 20 | | | 17.9% H$_3$BO$_3$ | A | APS | 25.3 | 8.5 |
| 56 | 80 | | 15 | | 5 | 7% H$_3$BO$_3$ | A | APS | 42.4 | 9.5 |
| 57 | 70 | | 15 | | 15 | 16.7% H$_3$BO$_3$ | A | APS | 31.7 | 8,8 |
| 58 | 80 | | 15 | | 5 | 15% H$_3$BO$_3$ | A | APS | 26.0 | 10,4 |
| 59 | 65 | 5 | | 30 | | 2.8% H$_3$BO$_3$ | A | APS | 3.6 | 3.8 |
| 60 | 60 | 10 | | 30 | | 5.2% H$_3$BO$_3$ | A | APS | 2.8 | 2.9 |
| 61 | 70 | 5 | 25 | | | | D | APS | 3.0 | 3.0 |
| 62 | 75 | 5[2] | 20 | | | | B | APS | 15,3 | 13.2 |
| 63 | 70 | 5 | 25 | | | | | APS | 8,5 | 6.9 |
| 64 | 73 | 2 | | 25 | | | / | APS | 3.0 | 4.1 |
| 65 | 80 | 2 | 15 | | 3 | 21.4% K$_2$CO$_3$ | B | APS/DBA | 39,1 | 17,3 |
| 66 | 38 | 2 | 55 | 5 | | | A | APS/DBA | 37,0 | 15,2 |
| 67 | 80 | 3 | 10 | 5 | 2 | 18.0% Na$_2$CO$_3$ | A | APS | 41,3 | 14,7 |
| 68 | 70 | 5 | 20 | 5 | | 3.3% H$_3$BO$_3$ | B | APS | 62,2 | 15,3 |

[1] VF
[2] VA

TEST OF APPLICATION: SHEARING STABILITY

When testing the suitability of the copolymers of the invention for use in the tertiary extraction of oil, the shearing stability, besides a residue-free solubility, is an important criterion of preselection.

To test the shearing stability, at first 500 ppm of copolymer (amount used relates to the content of the active substance) are dissolved in freshwater having a German hardness of 3.5° which corresponds to 35 mg of CaO/liter. A first determination of viscosity (A) is subsequently effected at room temperature. The solution is then subjected for a certain period of time to a shearing operation with a fast rotating stirrer and a second determination of viscosity ($A_1$) is carried out. The quotient of the two viscosity values $$\text{Factor}_{(shearing)} = A_1/A$$

is an indicator of the capacity of the flooding medium to sustain shearing stress at the given test conditions. For a selection of the copolymers the factors determined have been compiled in the following table:

| Copolymer | Factor (Shearing) |
|---|---|
| Table No. 37 | 0.68 |
| Table No. 41 | 0.64 |
| Table No. 43 | 0.73 |
| Table No. 47 | 0.63 |
| Table No. 54 | 0.72 |

The values of the remainder of the copolymers of the invention are in the same order of magnitude. At equal test conditions, commercially available copolymers of acrylamide and acrylic acid exhibit factors (shearing) of 0.55 to 0.40 and lower. The viscosity is determined in a Brookfield viscosimeter.

TEST OF APPLICATION: INJECTIVITY

For the injection of the flooding medium effected by the injection probe and in order to ensure a satisfactory flooding operation within the formation a solution is required which is free from solids and swellable bodies.

For determining the injectivity of solutions of the copolymers of the invention sand-packed glass tubes are flooded with a specific constant volume flow for 24 hours and at room temperature. In this process the pressure of the flooding medium is determined before said medium enters the flooding tube after periods of 1 hour ($P_1$) and 24 hours ($P_2$). The quotient $$\text{Factor}_{(Injectivity)} = P_2/P_1$$

is an indicator of the injectivity of the flooding medium at the given conditions. These tests are carried out using solutions of 1,000 ppm of copolymer in brine water consisting of 130 g of NaCl and 10 g of CaCl$_2$ per 1 liter. For a selection of the copolymers the factors determined are displayed in the following table:

| Copolymer | Factor (Injectivity) |
|---|---|
| Example No. 1 | 1.12 |
| Example No. 2 | 1.10 |
| Table No. 37 | 1.07 |
| Table No. 41 | 1.09 |
| Table No. 43 | 1.05 |
| Table No. 47 | 1.00 |
| Table No. 54 | 1.04 |

Solutions having a high content of gel bodies which, at times, occur in the case of commercially available polymers of acrylamide and acrylate show values of 1.9 and more and eventually cause clogging of the sand packing.

TEXT OF APPLICATION: VISCOSITY

The viscosity yield of a flooding agent in a given and frequently saline deposits and flooding water medium at the prevalent deposits temperature is a decisive criterion of whether or not such flooding agent is economically applicable. The viscosity behavior of acrylamide-containing polymers is codependent on the presence of divalent cations such as calcium and magnesium ions.

The following viscosity values where obtained for aqueous saline solutions (130 g of NaCl and 10 g of $CaCl_2$ per 1 liter) containing 2,000 ppm of copolymer, using the Brookfield viscosimeter at a shearing rate of $D = 7.3 \text{ sec}^{-1}$ and at 85° C.:

| Copolymer | Viscosity (mPs · s) |
|---|---|
| Example No. 1 | 6.3 |
| Example No. 2 | 7.7 |
| Table No. 37 | 5.4 |
| Table No. 41 | 6.0 |
| Table No. 43 | 5.3 |
| Table No. 47 | 3.3 |
| Table No. 54 | 4.9 |

Given equal conditions commercially available copolymers show substantially lower values.

TEST OF APPLICATION: THERMAL STABILITY

A further important citerion of judging polymers with respect to their suitability in tertiary extraction is the stability of the solutions to long-term thermal stress. The flooding mediums used should neither decrease substantially in their viscosities nor tend to form flocculations. For testing the thermal stability aqueous solutions containing 2,000 ppm of copolymer, 130 g of NaCl and 10 g of $CaCl_2$ are stored at elevated temperature. Samples are taken at regular intervals and are cooled to room temperature, with subsequent determination of viscosity. The values of viscosity obtained are related on a percentage basis to the values measured before storage was started. Thus, a value of 100% corresponds to a complete preservation of viscosity. As is disclosed in the following table the copolymers of the invention, in the form of their aqueous saline solutions, display stabilities ranging from good to very good.

| Copolymer | Preservation of Viscosity after a storage period of | |
|---|---|---|
| | 10 days | 30 days |
| Example No. 1 | 97% | 95% |
| Example No. 2 | 100% | 99% |
| Table No. 37 | 100% | 96% |
| Table No. 41 | 96% | 90% |
| Table No. 43 | 100% | 99% |
| Table No. 47 | 100% | 98% |
| Table No. 54 | 100% | 100% |

The solutions remain clear and limpid, with the exception of the copolymer No. 41 solution showing a slight turbidity. Test conditions being equal, commercially available copolymers display sustantially greated decreases in viscosity values and tend to form water-insoluble precipitations.

TEST OF APPLICATION: MOBILE BEHAVIOR

The enhanced efficiency of deoiling resulting from the flooding of oil-containing porous rock or sand formations by using water-soluble polymers is demonstrated in flooding experiments made in the laboratory. In these tests of application the floodings are effected in sand-packed flooding tubes which are filled with degassed deposits oil, so-called dead oil. The apparatus used for the flooding tests essentially consists of storage containers for various flooding mediums, an automatic pressure recorder, a feed pump for feeding the flooding medium a flooding tube and an automatic fraction collector for collecting the eluates.

The flooding tube is a glass tube of specific dimension which is charged with sand of defined grain size distribution and is saturated with the dead oil.

The selected flooding mediums are conveyed at a constant volume flow from the storage containers into the tempered, oil-saturated sand packing. In a blind test running parallel to each of these tests flooding takes place exclusively with synthetic formation water. Having passed through the sand packing the eluates are separately collected in the subsequent fraction collector and are determined volumetrically. A comparison of the amount of oil in the fraction collector obtained from the flooding tests using different copolymers of the invention as flooding agent and those without the addition of polymers produces evidence in support of the desired enhanced efficiency of deoiling resulting from the use of the compounds of the invention. Without the use of water-soluble polymer additives an average deoiling of the sand packing of 55 to 60% was achieved, using 2,000 ppm of copolymer in brine water containing 130 g of NaCl and 10 g of $CaCl_2$ per 1 liter. At 85° C. the values of overall deoiling were approximately 89 to 93% (for copolymers Nos. 43 and 54) and at 93 to 96% for copolymers of examples 1 and 2 and No. 41.

The efficiency and suitability of the copolymers of the invention for use in the tertiary flooding of oil has thus been demonstrated.

What is claimed is:

1. Water-soluble copolymers which consist essentially of a random distribution of 5 to 60% by weight of units of the formula

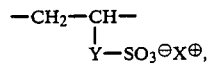

2 to 40% by weight of units of the formula

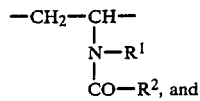

38 to 93% by weight of units of the formula

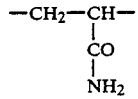

and partial hydrolysates thereof,
wherein when $R^1$ is hydrogen, $R^2$ is hydrogen, methyl or ethyl, Y is $-CO-NH-C(CH_3)_2-CH_2-$ or a direct bond, and $X^\oplus$ is a cation; when $R^1$ and $R^2$ are identical or different, each is hydrogen, methyl, ethyl or, together with trimethylene, Y is $-CO-NH-C(CH_3)_2-CH_2-$ and $X^\oplus$ is a cation;

with the proviso that the water-soluble copolymers may not consist of a random distribution 5 to 60% by weight of units of the formula

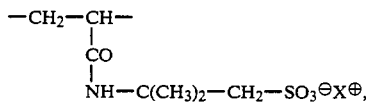

5 to 40% by weight of units of the formula

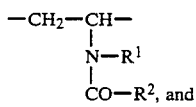

38 to 80% by weight of units of the formula

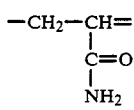

wherein $R^1$ and $R^2$ are identical or different and each is hydrogen, methyl or ethyl
and $X^\oplus$ is a cation,
produced by Trommsdorff-Norrish copolymerizing at 0° to 130° C. an aqueous mixture of monomers selected from
(a) 5 to 60 parts by weight of 2-acrylamido-2-methylpropanesulfonic acid of the formula

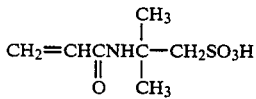

wherein the sulfonic acid is neutralized with base, 2 to 40 parts by weight of a vinylacylamide of the formula

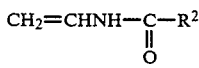

and 38 to 93 parts by weight of acrylamide,
(b) 5 to 60 parts by weight of vinylsulfonic acid of the formula

wherein the sulfonic acid is neutralized with base, 2 to 40 parts by weight of a vinylacylamide of the formula

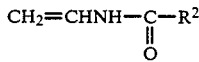

and 38 to 93 parts by weight of acrylamide, and
(c) 5 to 60 parts by weight of 2-acryl-2-amido-2-methylpropanesulfonic acid of the formula

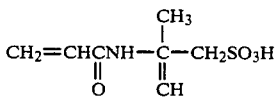

wherein the sulfonic acid is neutralized with base, 2 to 40 parts by weight of a vinylacylamide of the formula

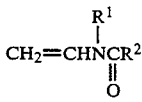

and 38 to 93 parts by weight of acrylamide, with the proviso that vinylsulfonic acid is a reactant, or said vinylacrylamide is a reactant in an amount of 2 to 5 parts by weight, or acrylamide is a reactant in an amount of 80 to 93 parts by weight.

2. Water-soluble copolymers according to claim 1 which consist essentially of a random distribution of 5 to 50% by weight of units of the formula

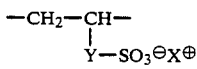

2 to 20% by weight of units of the formula

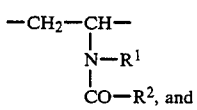

45 to 90% by weight of units of the formula

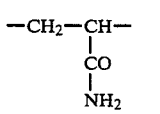

and partial hydrolysates thereof.

3. Water-soluble copolymers according to claim 1 or claim 2 wherein up to 60% of the units of the formula

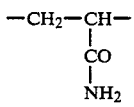

are hydrolysates of the formula

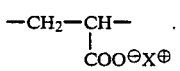

4. Water-soluble copolymers according to claim 3 containing a total of 20 to 60% by weight of units of the formula

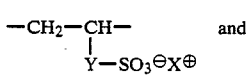

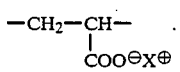

5. Water-soluble copolymers according to claim 1 containing borate anions in an amount of 2.5 to 35% by weight, calculated as $H_3BO_3$ and relative to the weight of the copolymer.

* * * * *